(Model.)

H. L. HEATON.
NUT LOCK WASHER.

No. 269,412.  Patented Dec. 19, 1882.

Witnesses.
Louis F. Gardner
E. D. York

Inventor.
H. L. Heaton,
per
F. A. Lehmann,
Att'y

UNITED STATES PATENT OFFICE.

HORACE L. HEATON, OF COLUMBUS, OHIO, ASSIGNOR OF THREE-FOURTHS TO HYLAS SABIN, GEORGE W. LUCE, AND JOHN M. TIBBETTS, OF SAME PLACE.

NUT-LOCK WASHER.

SPECIFICATION forming part of Letters Patent No. 269,412, dated December 19, 1882.

Application filed October 12, 1882. (Model.)

*To all whom it may concern:*

Be it known that I, HORACE L. HEATON, of Columbus, in the county of Franklin and State of Ohio, have invented certain new and useful Improvements in Nut-Lock Washers; and I do hereby declare the following to be a full, clear, and exact description of the invention, such as will enable others skilled in the art to which it pertains to make and use it, reference being had to the accompanying drawings, which form part of this specification.

My invention relates to an improvement in nut-lock washers; and it consists in a washer either formed as a part of the nut itself or independently thereof, and which has two spiral springs formed as a part of the washer, as will be more fully described hereinafter.

The object of my invention is to form two spiral springs as an integral part of the washer whether the washer is formed as a part of the nut or not, so that when the nut is screwed into place the springs will be compressed, and thus cause the threads of the nut to bear with such force against the threads of the bolt that the nut cannot work loose.

Figure 1:
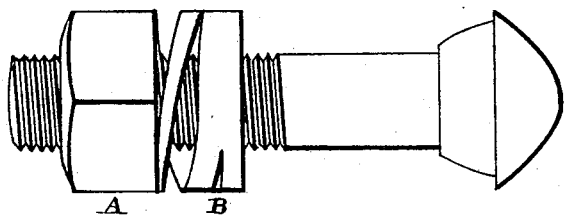
Figure 2:
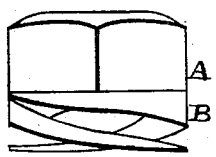
Figure 3:
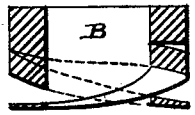
Figure 4:
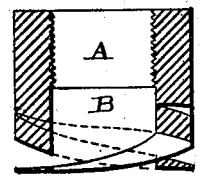

Figure 1 is a side elevation of a bolt, nut, and spring-washer, the washer being formed separate from the nut. Fig. 2 is a similar view of the nut and washer formed in a single piece. Fig. 3 is a vertical cross-section of the washer alone. Fig. 4 is a similar view of the nut and washer combined.

A represents the nut, and B the washer. The nut and washer may be made in a single piece, if so desired, in which case the washer may be made with or without a screw-thread. On the lower or inner side of the washer are formed one or more curved tapering tangs, which act as springs to force the nut upward or outward, and thus cause it to bite against the thread of the bolt and lock it in place. The tang or tangs form part of the washer itself, and, being made of tempered steel, they form spring bearing-surfaces for the nut.

I am aware that a nut has been made from a continuous coil of metal, and this I disclaim. My invention differs from this in forming the springs on the inner side of the washer and in a single piece with it.

I am also aware that spring-washers of various kinds have been used; but in no case has the washer been formed in one solid piece and the springs as an integral part thereof.

Having thus described my invention, I claim—

As a new article of manufacture, a nut-lock washer having the two tapering springs made in one solid piece with the washer, substantially as shown and described.

In testimony whereof I affix my signature in presence of two witnesses.

HORACE L. HEATON.

Witnesses:
JOHN M. TIBBETTS,
A. B. NORTON.